United States Patent
Conboy et al.

(10) Patent No.: US 6,928,333 B1
(45) Date of Patent: Aug. 9, 2005

(54) SCHEDULING METHOD FOR AUTOMATED WORK-CELL TRANSFER SYSTEM

(75) Inventors: Michael R. Conboy, Austin, TX (US); Patrick J. Ryan, Eugene, OR (US); Elfido Coss, Jr., Austin, TX (US)

(73) Assignee: Advance Micro Devices, Inc., Sunnyvale, CA (US)

( * ) Notice: Subject to any disclaimer, the term of this patent is extended or adjusted under 35 U.S.C. 154(b) by 504 days.

(21) Appl. No.: 09/387,174

(22) Filed: Aug. 31, 1999

(51) Int. Cl.[7] .............................................. G06F 19/00
(52) U.S. Cl. ....................................... 700/112; 700/99
(58) Field of Search .......................... 700/99, 100, 106, 700/112, 115, 116, 121, 213, 214, 95

(56) References Cited

U.S. PATENT DOCUMENTS

| | | | | |
|---|---|---|---|---|
| 4,829,445 A | * | 5/1989 | Burney | 700/230 |
| 5,467,285 A | * | 11/1995 | Flinn et al. | 700/95 |
| 5,493,501 A | * | 2/1996 | Kondo | 700/95 |
| 5,737,228 A | * | 4/1998 | Ishizuka et al. | 700/102 |
| 5,805,452 A | * | 9/1998 | Anthony et al. | 700/142 |
| 5,838,566 A | * | 11/1998 | Conboy et al. | 700/115 |
| 5,867,388 A | * | 2/1999 | Okumura et al. | 700/112 |
| 5,880,960 A | * | 3/1999 | Lin et al. | 700/99 |
| 5,889,673 A | * | 3/1999 | Pan et al. | 700/97 |

* cited by examiner

*Primary Examiner*—Leo Picard
*Assistant Examiner*—Zoila Cabrera

(57) ABSTRACT

According to an example embodiment, the present invention is directed to a new and efficient method for bringing at least two items together from independent locations via separate paths in a computer controlled manufacturing environment. Using the computer, the probabilities for pickup and delivery of each of the two items are generated and used to determine an efficient manner in which to bring the items together via the separate paths.

20 Claims, 2 Drawing Sheets

SCHEDULING METHOD FOR AUTOMATED WORK-CELL TRANSFER SYSTEM

RELATED APPLICATIONS

The present invention is related to U.S. patent application Ser. No. 08/990,059, now U.S. Pat. No. 6,108,585 entitled "PROBABILISTIC DISPATCHING METHOD AND ARRANGEMENT" filed on Dec. 12, 1997, and U.S. patent application Ser. No. 09/387,613, now U.S. Pat. No. 6,338,005 entitled "MANAGING TEST MATERIAL IN AN AUTOMATED MATERIAL HANDLING SYSTEM" filed on Aug. 31, 1999, and U.S. patent application Ser. No. 09/130,766, now U.S. Pat. No. 6,008,095 entitled "REAL TIME DECISION MAKING SYSTEM FOR REDUCTION OF TIME DELAYS IN AN AUTOMATED MATERIAL HANDLING SYSTEM" filed on Aug. 31, 1999, which are incorporated herein by reference.

FIELD OF THE INVENTION

The present invention generally relates to automated material handling systems and, more particularly, to systems and methods for scheduling automated work-cell material handling systems.

BACKGROUND OF THE INVENTION

Automated material handling systems are used in a variety of industries to move various materials from one location to a another location. Semiconductor fabrication facilities, in particular, commonly employ automated material handling systems for fabricating integrated circuits on semiconductor wafers.

A conventional semiconductor fabrication plant typically includes multiple fabrication areas or bays interconnected by a path, such as a conveyor belt. Each bay generally includes the requisite fabrication tools (interconnected by a subpath) to process semiconductor wafers for a particular purpose, such as photolithography, chemical-mechanical polishing, or chemical vapor deposition, for example. Material stockers or stocking tools generally lie about the plant and store semiconductor wafers waiting to be processed. The wafers are usually stored in cassettes each of which typically hold up to 25 wafers. Each material stocker typically services two or more bays and can hold hundreds of cassettes.

The semiconductor fabrication plant, including the bays, material stockers and the interconnecting path, typically operates under control of a distributed computer system running a factory management program, such as Work-Stream Open sold by Consilium, Inc. In this environment, the automated material handling system may conceptually include the cassettes, the transportation system (e.g., paths) and control system (e.g., the distributed computer system).

A typical semiconductor fabrication plant, such as the one described above, is capable of processing thousands of wafers at any given time. The wafers are typically divided into lots which undergo different processing sequences. Each processing sequence typically includes a number of processing steps, each defined by a process specification. In order to manage the transportation required for processing such a large number of wafers through various processing steps, manufacturers commonly employ transfer systems. The efficiency of the transfer systems is important for maintaining the efficiency of the overall manufacturing process and keeping the manufacturing cost of the wafers at as low as possible. Many present material handling systems, however, exhibit excess movement of materials through the system which negatively impacts manufacturing throughput.

Semiconductor manufacturers compete in a highly competitive and capital-intensive industry. A state-of-the-art semiconductor fabrication plant typically includes hundreds of different fabrication tools and can cost $1 billion or more. New plants can also become obsolete relatively quickly as the dimensions of semiconductor devices decrease. Consequently, to manufacture a cost-effective competitive product, semiconductor manufacturers continually seek to increase the throughput and yield of semiconductor wafers.

SUMMARY OF THE INVENTION

The present invention is directed to a method and system for scheduling a work-cell transfer system in automated material handling systems.

According to an example embodiment of the present invention, a computer controlled manufacturing environment has a plurality of alternate locations for a plurality of manufacturing processes. At least two objects meet at a junction of at least two routes. A distribution of events indicative of the alternate locations at which material is processed is established, and a routing decision for the at least two objects is formulated. An interval at which to re-establish the distribution of events is determined, the distribution of events is re-established, and a routing decision is re-formulated for at least one of the two objects.

According to another example embodiment of the present invention, a system is arranged for routing material in a computer controlled manufacturing environment having a plurality of alternate locations for a plurality of manufacturing processes. At least two objects meet at a junction of at least two routes. A computer arrangement is adapted to establish a distribution of events indicative of the alternate locations, formulate a routing decision for the at least two objects in response to the established distribution of events, determine an interval at which to re-establish the distribution of events, and re-formulate a routing decision for the at least two objects in response to the re-established distribution of events. A plurality of transport arrangements are adapted to transport the at least two objects via the at least two routes.

In another example embodiment, the present invention includes a method for transferring material across a junction via at least one route on each side of the junction. The material is transported in cassettes at each side of the junction and in a computer controlled manufacturing environment having a plurality of alternate locations for a plurality of manufacturing processes. Ranges of relative probability figures are generated for the respective alternate locations as a function of the events from the recording step, and a next manufacturing process step for the material for transfer is identified. A random probability is generated and one of a plurality of alternate junctions and one of a plurality of alternate cassettes is selected. The material for the next manufacturing process step is routed via the junction and cassette, wherein the junction and cassette have a range of probability figures that includes the random probability. The material is then transferred via a first cassette to the selected one of the plurality of alternate junctions and subsequently to the one of the plurality of alternate cassettes.

The above summary of the present invention is not intended to describe each illustrated embodiment or every implementation of the present invention. The figures in the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
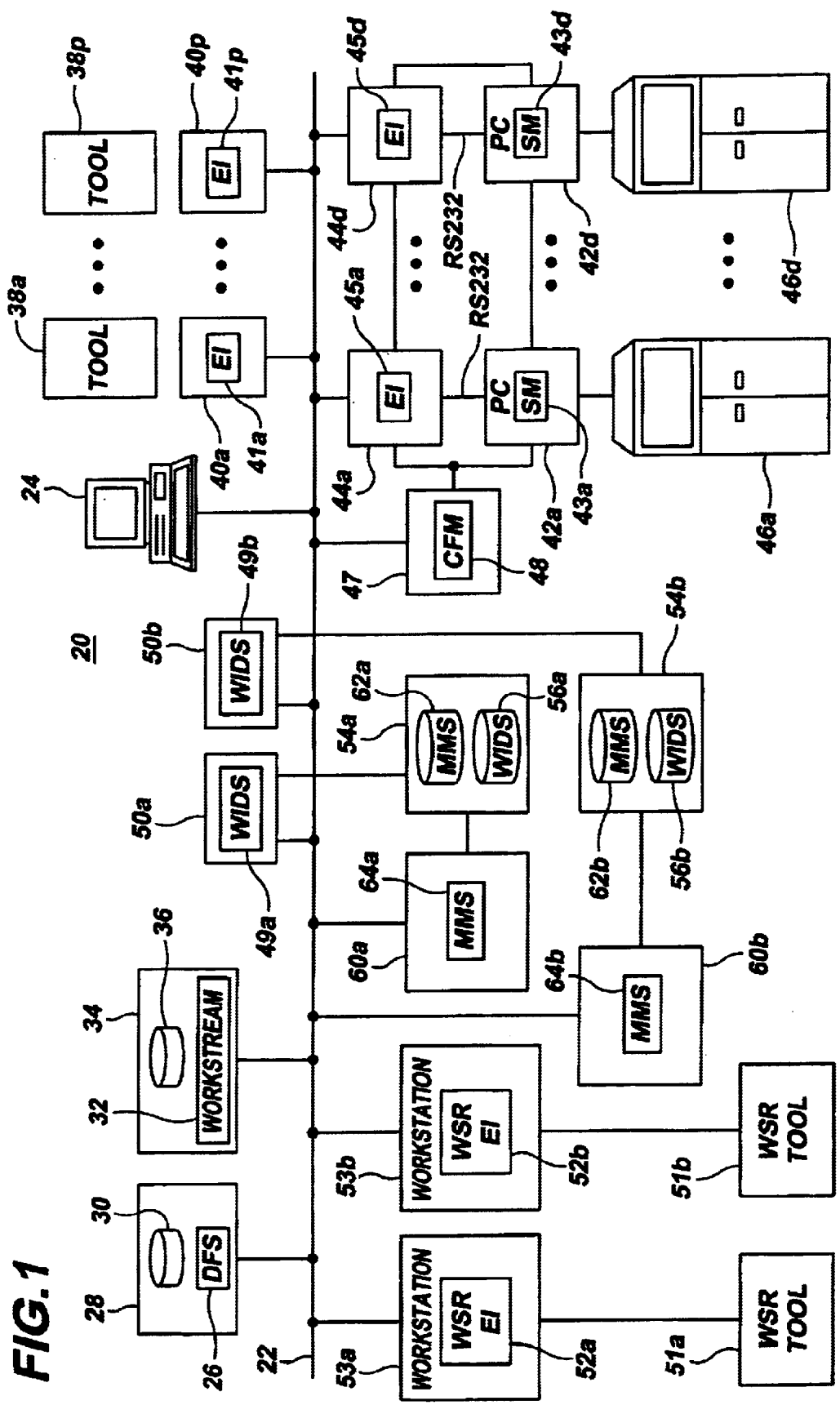
FIG. 1 is a schematic diagram depicting the architecture of a manufacturing control system, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

According to an example embodiment, the present invention is directed to a new and efficient method for bringing at least two objects together from independent locations via separate routes in a computer controlled manufacturing environment. Using the computer, the probabilities for pickup and delivery of each of the two objects are determined and used to determine an efficient manner in which to bring the objects together via the separate routes. For example, the at least two objects may include a semiconductor wafer and a semiconductor wafer cassette, each initially located independently of the other. The probabilities for delivering the wafer and cassette to a junction where the wafer is placed in the cassette are determined via the computer arrangement. Using the determined probabilities, the pickup and delivery of the wafer and cassette to the junction are coordinated. In a more particular example embodiment, the pickup and delivery is accomplished using a transport arrangement, such as a robot.

In another example embodiment of the present invention, a computer controlled manufacturing environment has a plurality of alternate locations for a plurality of manufacturing processes. At least two objects meet at a junction of at least two routes. A distribution of events indicative of the alternate locations at which material is processed is established, and a routing decision for the at least two objects is formulated. An interval at which to re-establish the distribution of events is determined, the distribution of events is re-established, and a routing decision is re-formulated for at least one of the two objects. Using this example embodiment, the efficiency of the manufacturing environment can be improved in manners including a reduction in idle time, a reduction in the amount of material and material containers needed, and a smaller and more controllable manufacturing environment.

In a more particular example embodiment of the present invention, the material is transported in cassettes at each side of the junction. The distribution of events is established by recording events indicative of the alternate locations. A range of relative probability figures is generated as a function of the recorded events. A next manufacturing step is generated for the material. A random probability is generated and one of a plurality of alternate junctions and cassettes are selected via which to route the material for the next manufacturing process, wherein the junction and cassette have a range of probability figures that includes the random probability. The material is then transferred via a first cassette to the selected alternate junction and transferred to an alternate cassette.

For example, FIG. 1 shows a computer controlled manufacturing system 20 for the fabrication of integrated circuits on semiconductor wafers. The system is adapted to establish the distribution of events, formulate the routing decision, determine the interval, re-establish the events and re-formulate the routing decision. The system 20 has a central bus 22 to which the various control elements are coupled. The language or protocol used on the bus 22 is called ISIS and is sold by ISIS Distributed Systems. A personal computer 24 is coupled to the bus 22 for ad hoc access to all movement functions for the cassettes and wafers.

A distributed factory system (DFS) computer program 26 sold by Consilium, Inc. is resident on a UNIX workstation 28. The UNIX workstation 28 connects to the bus 22 for controlling, by use of the DFS 26, the manufacturing process of the wafers. A database 30 for use by the DFS 26, for supplying the needed information to the DFS 26, is also resident on the workstation 28. The database 30 is also supplied by Consilium, Inc. with the DFS 26.

The DFS 26 is the newest version of Consilium's older computer program 32, called "WorkStream Open" or "WorkStream" for short. The program 32 is resident on a UNIX workstation 34, which is also used to control the manufacturing process of the wafers. A database 36 for use by the WorkStream program 32, for supplying information to the WorkStream program 32, is also resident on the workstation 34. The database 36 is supplied by Consilium, Inc. with the WorkStream program 32.

Example tools 38a through 38p used in the manufacturing process of the semiconductor wafers are coupled to the bus 22 via Hewlett Packard work stations 40a through 40p, running equipment interface ("EI") programs 41a through 41p, respectively. The equipment interface programs 41a through 41p function as translators between the language of the tools and the ISIS language of the bus 22.

Stocker manager (SM) computers 42a through 42d are coupled to the bus 22 via Hewlett Packard work stations 44a through 44d, running equipment interface ("EI") programs 45a through 45d, respectively. The SMs 43a–d of computers 42a–d are coupled to the EIs 45a–d of computers 44a via a SECS II protocol and RS232 connections between computers 42a–d and 44a–d, respectively.

In an example embodiment, each stocker 46a–d is controlled by a SM computer 42a–d. The computers 42a–42d run Sunsoft's "Interactive UNIX" as an operating system, and SM application programs 43a through 43d, licensed by Daifuku. The computers 42a–42d are inter-coupled to each other via an Ethernet.

The CFM program 48 on computer 47 is coupled to and controls all the SM computers 42a–42d. Computer 47 is also coupled to the bus 22. The CFM program 48 functions as a global database manager for the SMs 43a–d and passes misdirected messages to the correct object.

The computers 42a–42d schedule movement of the cassettes in and out of material stockers and other locations, and keep track of all the cassettes in each stocker as well as the lot numbers assigned to each stocker. Four material stockers 46a through 46d connect to the personal computers 42a–42d for storing empty cassettes and cassettes of wafers.

Note that SMs 43a–d are shown in a distributed environment. In an alternate embodiment, a single centralized SM can be configured and arranged to control all the stockers. Selection of a distributed versus a centralized SM depends upon particular manufacturing requirements.

When a lot is entered into a stocker, stocker 46a, for example, the cassette identifier containing the lot is read and the information is forwarded from the SM 43*a* to the appropriate one of DFS computers 28 or 34 via EI 45*a*. The DFS then looks up the next operation and destination for the lot. Note that present DFSs, as exemplified by DFS 26 and WorkStream 32, only identify a single next destination and operation. The next operation and destination are forwarded to the SM 43*a*.

In accordance with the present invention, when an example SM 43*a* receives the next operation and destination, the SM 43*a* performs its own selection of a destination (stocker) where there are multiple destinations at which the designated operation may be performed. A record is kept of destinations (stockers) from which lots are removed for performing respective operations. As a function of the record of removal events, SMs 43*a–d* select next destinations. For instance, the next destination can be selected according to the most likely destinations at which lots will be removed for performing the operations, or according to the most likely destinations where a corresponding part will be delivered, such as a wafer cassette for a wafer. The keeping of records and the selection of next destinations may, for example, be repeated at various intervals in the manufacturing process.

Two wafer ID servers (WIDS) 49*a*, 49*b*, which are computer programs resident on UNIX workstations 50*a*, 50*b*, respectively, maintain information such as regarding the wafers and wafer cassettes in WIDS databases 56*a*, 56*b* respectively. Databases 56*a*, 56*b* are resident on UNIX workstations 54*a*, 54*b*, respectively. The WIDS 49*a*, 49*b* maintain in the databases 56*a*, 56*b* information such as wafer IDs, positions of the wafers within the cassettes, and the process steps through which each wafer passes. The WIDS database 56*a* is a backup database to the WIDS database 56*b*, for providing redundancy.

Wafer sorters (WSR) 51*a*, 51*b* are tools that move wafers within and/or between cassettes. They also verify the identity of wafers and cassettes, sort wafers, and split and merge lots. The WSR 51*a*, 51*b* are coupled to the bus 22 via WSR equipment interface programs 52*a*, 52*b*, respectively, resident on Hewlett Packard workstations 53*a*, 53*b*, respectively. The WSR equipment interface programs 52*a*, 52*b* act as translators between the language of the WSR 51*a*, 51*b* and the ISIS language of the bus 22.

Two workstations 60*a*, 60*b* are coupled to the bus 22 and to the workstations 54*a*, 54*b*, for access to material movement server (MMS) databases 62*a*, 62*b*. The two MMS databases 62*a*, 62*b* contain information such as the original cassette IDs, the colors of the cassettes (zone restrictions), cassette tags, lots-to-tags mapping, and configuration information regarding the stockers 46. The two MMS databases 62*a*, 62*b* are also used to validate the cassette Ids. In an alternate embodiment, the two MMS databases 62*a*, 62*b* are extensions of the Workstream database 36.

The two MMS programs 64*a*, 64*b* mesh the two WIDS 49*a*, 49*b* and the two MMS databases 62*a*, 62*b* with the DFS program 26 and with the WorkStream program 32, using the ISIS bus protocol. The MMS programs 64*a*, 64*b* allow a requester to retrieve a cassette tag or ID for a given lot ID, or retrieve a lot ID for a given cassette ID.

The MMS programs 64*a*, 64*b* provide facilities for accessing lot and cassette data for shop floor control, provide protocols to external entities to facilitate movement of the wafers on the shop floor, provide user interfaces for ad-hoc use by operators, and are sensitive to time-out values when interacting with the equipment interfaces 45*a* through 45*d*.

In connection with the present invention, and in reference to FIG. 1, please see U.S. patent application Ser. No. 08/990,059, now U.S. Pat. No. 6,108,585 filed on Dec. 12, 1997 for a more detailed description of an example embodiment for recording, maintaining, and using data in regard to the processing of manufacturing material. In particular, the '059 application is relevant to the generation of ranges of relative probability figures and a random probability, and to the selection of alternate manufacturing routes using the probabilities.

Figure 2:
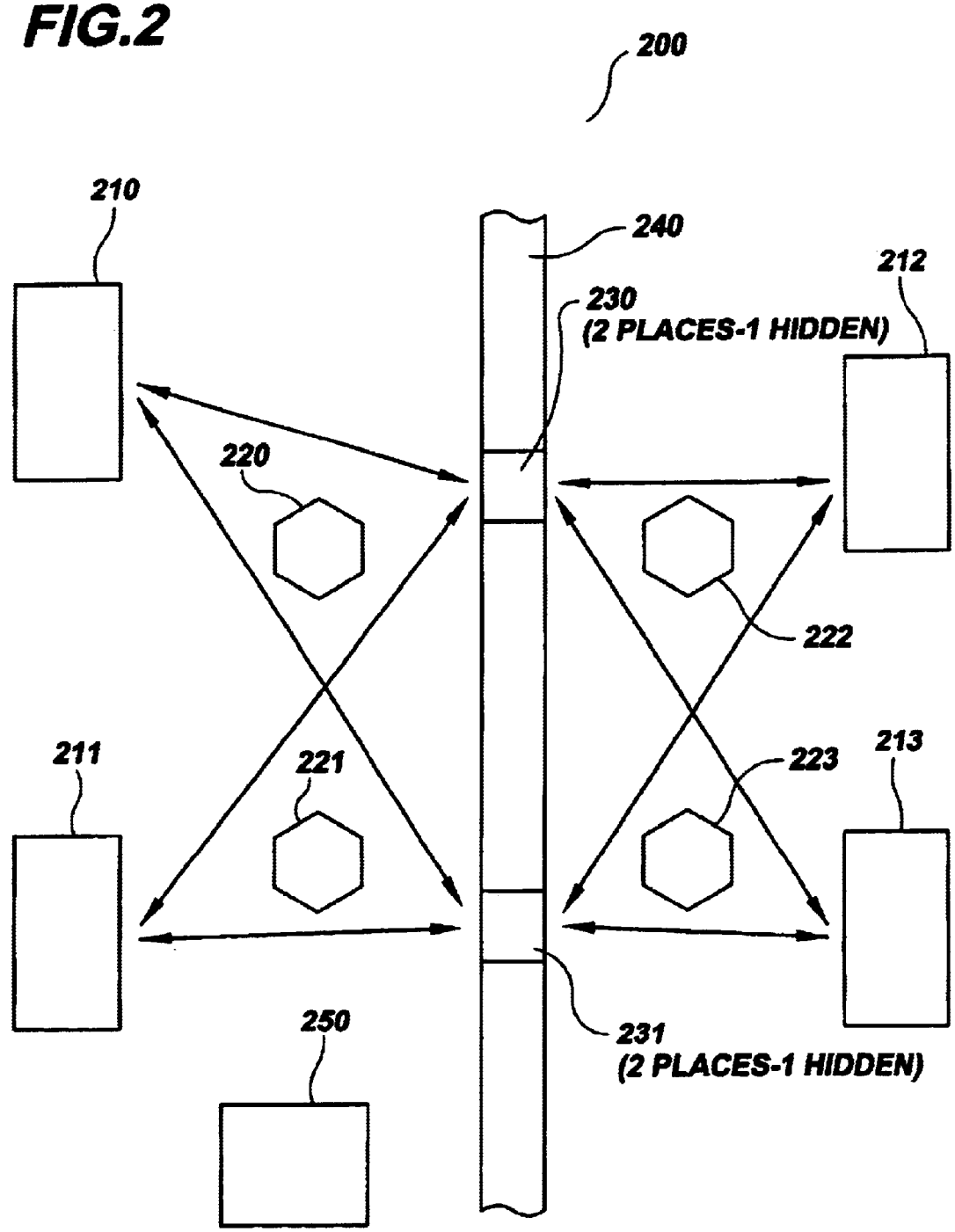
FIG. 2 is a diagram showing the physical layout of a manufacturing work cell, according to an example embodiment of the present invention.

According to another example embodiment of the present invention, FIG. 2 shows an example schematic arrangement 200 for routing manufacturing material across a barrier 240. The barrier 240 may include items such as a wall, a curtain, a door, or a window. A plurality of material stockers 210–213 hold material for processing in at least one cassette. When the material is needed for processing, a first one of the plurality of robots 220 or 221 is used to retrieve the material from one of the stockers 210 or 211 at a first side of the barrier 240 and deliver it to one of the transfer units 230 or 231 at the barrier 240. The transfer units are shown with two stacked vertically at each location, with one hidden transfer unit below each showing unit. The transfer unit transfers the material across the barrier 240 where the material is retrieved by a second one of the plurality of robots 222 or 223 at the second side of the barrier 240. The second robot transfers the material to one of the stockers 212 or 213 at the second side of the barrier 240. Each of the transfers is coordinated via computer arrangement 250 for optimizing the efficiency of the delivery of material, using the methods described herein.

In another example embodiment of the present invention, and using the computer arrangement for scheduling and controlling the material movement, the material is initially held in a first cassette and the robot 220 delivers the first cassette holding the material from stocker 210 at a first side of the barrier 240 to the transfer unit 230. A second cassette, initially empty, is brought to the transfer unit 230 at the second side of the barrier 240. Alternatively, the second cassette may have been held at the transfer unit from a previous process. The computer arrangement 250 may be used to ensure that the empty cassette is proper for the material to be transferred. The transfer unit 230 empties the first cassette and transfers the material to the second cassette. The first cassette, now empty, may be made available for additional processing of other material, or may be returned back to one of the stockers 210 or 211 at the first side of the barrier 240 by the robot 220. A robot 222 from the second side of the barrier 240 is used to retrieve the material, now in the second cassette, and deliver the second cassette to another stocker 212 at the second side of the barrier 240.

In another example embodiment of the present invention, the robots, transfer units, and stockers are also coupled to the central bus 22 of FIG. 1 for use with the manufacturing system 20. Status information is delivered via the bus 22 for use by the various processors for making decisions regarding the manufacturing process, such as which robot to use, or whether to leave an empty cassette at a transfer unit.

The interval used for establishing a distribution of events and making decisions for routing in the manufacturing process can be determined using a variety of information. For example, the interval may be a simple time interval set prior to beginning the routing process. However, if a particular piece of equipment, such as a stocker, a transfer unit, or a robot goes out of service, the routing decision incorporates that information as an interval and chooses alternative routes for the material. The interval also may include a change in the availability of material for processing, a malfunction, or a manual change in the process.

In another example embodiment of the present invention, the formulation of the routing decision can take one or more outside conditions into consideration. For example, the material for transfer may include material of different priority levels. The higher priority level material may take precedent over lower priority material, even if using that precedent means a drop in efficiency. Other conditions may include process data regarding other material in the manufacturing environment, a process or equipment malfunction, the length of the route to the process, a preventive maintenance shutdown, material handler availability (such as a cassette), or the need for a cassette for another subsequent material transfer. The computer arrangement can be used to monitor these and other conditions.

The outside conditions can also be used as part of the formulation of the probability of the need for a material transfer, which can be used to formulate the routing decision. For example, a count-down timer can be used as a basis for a trigger for delivering objects, such as manufacturing materials or material containers. The timer is based on the operation of the various manufacturing processes. As the processes proceed, the probability that a material transfer is needed increases. Historical data including the time that it takes a manufacturing process to finish, along with an established distribution of events associated with the manufacturing process, can be used in determining the probability. If the process malfunctions, the probability does not change until the process resumes. For instance, if the process cannot proceed, the probability may be reduced or re-started as a new process is begun. Alternatively, if the process cannot proceed and new material is necessary to resume processing, the probability may be increased to reflect the immediate or impending need for additional material.

Using historical data, such as the time it takes for objects to be transferred and the time it takes for a manufacturing process to finish, a threshold probability for the need for material is defined. As the timer counts down, the probability that a material transfer is needed approaches the threshold probability. When the probability reaches the threshold, the routing decision is made.

Another advantage of using a timer in formulating a routing decision involves the determination of which of several manufacturing processes to prepare a material transfer for. For example, in a semiconductor wafer manufacturing process, there may be four empty wafer cassettes in a pool. When more than four processes will need a material transfer, timers for each process and related probabilities generated can be used to make a decision as to where to route each of the empty wafer cassettes. The processes having one of the four highest probabilities will be sent an empty wafer carrier first, based upon which reach a threshold probability level first.

While the present invention has been described with reference to several particular example embodiments, those skilled in the art will recognize that many changes may be made thereto without departing from the spirit and scope of the present invention, which is set forth in the following claims.

What is claimed is:

1. A method for routing material in a computer controlled manufacturing environment having a plurality of alternate locations for a plurality of manufacturing processes, wherein at least two objects meet at a junction of at least two routes, the method comprising:

establishing a distribution of events indicative of the alternate locations at which material is processed;

in response to establishing the distribution of events, formulating a routing decision for the at least two objects;

determining an interval at which to re-establish the distribution of events;

in response to determining the interval, re-establishing the distribution of events and re-formulating a routing decision for the two objects.

2. The method of claim 1, wherein the interval is determined using at least one of:

a predetermined time interval, a change in status of an alternate location, a change in availability of at least one of the at least two objects, a manual process change, and a malfunction in the process.

3. The method of claim 1, wherein the alternate locations include a plurality of alternate robots, a plurality of alternate transfer units, a plurality of material cassettes, and a plurality of stocker units.

4. The method of claim 1, wherein the objects include a semiconductor wafer and a semiconductor wafer cassette.

5. The method of claim 1, wherein formulating a routing decision includes formulating as a function of at least one of: the priority level associated with material needing transfer, process data regarding other material in the manufacturing environment, a process malfunction, an equipment malfunction, the availability of a material cassette, the need for a material cassette for transfer of a subsequent material transfer, and a scheduled equipment outage at a manufacturing process location.

6. The method of claim 1, wherein formulating a routing decision includes formulating to achieve route efficiency.

7. A system for routing material in a computer controlled manufacturing environment having a plurality of alternate locations for a plurality of manufacturing processes, wherein at least two objects meet at a junction of at least two routes, the system comprising:

a computer arrangement adapted to establish a distribution of events indicative of the alternate locations, formulate a routing decision for the at least two objects in response to the established distribution of events, determine an interval at which to re-establish the distribution of events, and re-formulate a routing decision for the at least two objects in response to the re-established distribution of events; and a plurality of transport arrangements adapted to transport the at least two objects via the at least two routes.

8. A system according to claim 7, wherein the plurality of transport arrangements comprise:

a plurality of cassettes adapted to carry material;

a plurality of stocking units adapted to stock material;

a plurality of transfer units adapted to receive and deliver material; and a plurality of robots adapted to deliver the material between the stocking units and the transfer units.

9. The system of claim 8, wherein the computer arrangement is adapted to monitor the location of each cassette and determine which type of material is capable of use with each cassette.

10. The system of claim 7, wherein the computer arrangement is further adapted to control the plurality of transport arrangements.

11. The system of claim 7, wherein the computer arrangement is further adapted to monitor changes to the manufacturing environment and, responsive to the monitored changes, re-establish the distribution of events indicative of the alternate locations.

12. A system for routing material in a computer controlled manufacturing environment having a plurality of alternate locations for a plurality of manufacturing processes, wherein at least two objects meet at a junction of at least two routes, the system comprising:
- means for establishing a distribution of events indicative of the alternate locations at which material is processed;
- means for formulating a routing decision for the at least two objects in response to an established distribution of events;
- means for determining an interval at which to re-establish the distribution of events; and
- means for re-establishing the distribution of events in response to determining an interval.

13. A method for transferring material across a junction via at least one route on each side of the junction in a computer controlled manufacturing environment having a plurality of alternate locations for a plurality of manufacturing processes, wherein the material is transported in cassettes at each side of the junction, the method comprising:
- recording events indicative of the alternate locations at which material is processed;
- generating ranges of relative probability figures for the respective alternate locations as a function of the events from the recording step;
- identifying a next manufacturing process step for the material for transfer;
- generating a random probability;
- selecting one of a plurality of alternate junctions and one of a plurality of alternate cassettes via which to route the material for the next manufacturing process step, the one junction and one cassette having a range of probability figures that includes the random probability; and
- transferring the material via a first cassette to the selected one of the plurality of alternate junctions and transferring the material to the one of the plurality of alternate cassettes.

14. The method of claim 13, wherein the alternate locations include a plurality of junctions, a plurality of transfer robots, a plurality of cassettes, a plurality of stockers, and a plurality of transfer units.

15. The method of claim 13, wherein recording events indicative of the alternate locations at which material is processed includes recording the type of material at each of the alternate locations.

16. The method of claim 13, wherein selecting one of a plurality of alternate cassettes includes selecting a cassette that is located at the junction.

17. The method of claim 13, wherein selecting one of a plurality of alternate cassettes includes selecting a cassette that is located away from the junction, further comprising transferring the cassette to the junction.

18. The method of claim 13, wherein recording events includes recording at least one of: the priority level associated with material needing transfer, process data regarding other material in the manufacturing environment, the availability of process locations, a process malfunction, an equipment malfunction, and a scheduled equipment outage at a manufacturing process location.

19. The method of claim 13, wherein the first cassette is further used in another transfer process.

20. A method for routing material in a computer controlled manufacturing environment having a plurality of alternate locations for a plurality of manufacturing processes, wherein at least two objects meet at a junction of at least two routes, the method comprising:
- establishing a distribution of events indicative of the alternate locations at which material is processed;
- in response to establishing the distribution of events, formulating a routing decision for the at least two objects including adapting a timer to count-down responsive to the plurality of manufacturing processes;
- defining a threshold probability level as a function of the plurality of manufacturing processes;
- determining a probability as a function of the established distribution of events and the plurality of manufacturing processes; and
- responsive to the determined probability reaching the threshold probability level, formulating the routing decision;
- determining an interval at which to re-establish the distribution of events;
- in response to determining the interval, re-establishing the distribution of events and re-formulating a routing decision for at least one of the two objects.

* * * * *